United States Patent
Qing et al.

(10) Patent No.: US 12,484,791 B2
(45) Date of Patent: Dec. 2, 2025

(54) ORTHOSTATIC HYPOTENSION MONITORING METHOD AND APPARATUS

(71) Applicant: SHENZHEN MINDRAY BIO-MEDICAL ELECTRONICS CO., LTD., Shenzhen (CN)

(72) Inventors: Lei Qing, Shenzhen (CN); Weiwei Yuan, Shenzhen (CN); Jianfang Cao, Shenzhen (CN); Jieying Lin, Shenzhen (CN)

(73) Assignee: SHENZHEN MINDRAY BIO-MEDICAL ELECTRONICS CO., LTD., Shenzhen (CN)

( * ) Notice: Subject to any disclaimer, the term of this patent is extended or adjusted under 35 U.S.C. 154(b) by 987 days.

(21) Appl. No.: 17/533,171

(22) Filed: Nov. 23, 2021

(65) Prior Publication Data
US 2022/0160241 A1      May 26, 2022

(30) Foreign Application Priority Data
Nov. 23, 2020   (CN) .......................... 202011322311.1

(51) Int. Cl.
*A61B 5/021*   (2006.01)
*A61B 5/00*    (2006.01)
(Continued)

(52) U.S. Cl.
CPC .............. *A61B 5/021* (2013.01); *A61B 5/024* (2013.01); *A61B 5/1116* (2013.01); *A61B 5/742* (2013.01); *A61B 5/7465* (2013.01)

(58) Field of Classification Search
CPC .............................. A61B 5/1116; A61B 5/742
See application file for complete search history.

(56) References Cited

U.S. PATENT DOCUMENTS 6,738,666 B1    5/2004  Park et al.
9,050,471 B2 *  6/2015  Skelton ................. G16H 20/30
(Continued)

FOREIGN PATENT DOCUMENTS

CN    101990415 A    3/2011
CN    102813507 A    12/2012
(Continued)

OTHER PUBLICATIONS

Extended European Search Report issued in related European Application No. 21209877.6, mailed Apr. 21, 2022, 11 pages.
(Continued)

*Primary Examiner* — Eric F Winakur
*Assistant Examiner* — Hy Khanh Doan
(74) *Attorney, Agent, or Firm* — Morgan, Lewis & Bockius LLP

(57) ABSTRACT

Embodiments of this disclosure provide an orthostatic hypotension monitoring method. The method includes displaying a blood pressure monitoring interface having operation instruction information that instructs an operator to confirm a posture state of a monitored object; measuring physiological parameter data of the monitored object, in response to the state confirmation instruction of the operator, and acquiring an orthostatic hypotension monitoring result based on the physiological parameter data automatically. This method can provide the operator with an auxiliary interface according with the orthostatic hypotension assessment process, and guide the operator to complete the orthostatic hypotension assessment according to the standardized assessment criteria. Accordingly, the operation process is simple and convenient, and the accuracy of the monitoring results is relatively high. In additional, an orthostatic hypotension monitoring apparatus is further provided in this disclosure.

19 Claims, 10 Drawing Sheets

(51) Int. Cl.
*A61B 5/024* (2006.01)
*A61B 5/11* (2006.01)

(56) References Cited

U.S. PATENT DOCUMENTS

| | | | |
|---|---|---|---|
| 2011/0263950 | A1 | 10/2011 | Larson et al. |
| 2016/0029904 | A1* | 2/2016 | Quinn ..................... A61B 5/11 |
| | | | 600/499 |
| 2017/0265782 | A1 | 9/2017 | Vollmer |
| 2018/0064350 | A1 | 3/2018 | Thakur et al. |
| 2019/0313915 | A1 | 10/2019 | Tzvieli et al. |
| 2020/0138308 | A1 | 5/2020 | Lee et al. |
| 2020/0297223 | A1* | 9/2020 | Cho ................... A61B 5/02116 |
| 2021/0030610 | A1* | 2/2021 | Lightcap ............ A61B 5/02405 |
| 2021/0295661 | A1* | 9/2021 | Tadele ................. A61B 5/6892 |

FOREIGN PATENT DOCUMENTS

| | | |
|---|---|---|
| CN | 102819654 A | 12/2012 |
| CN | 105979870 A | 9/2016 |
| CN | 106793964 A | 5/2017 |
| EP | 2344242 A1 | 7/2011 |
| JP | 3121842 U | 6/2006 |
| KR | 20100035884 A | 4/2010 |
| KR | 101196571 B1 | 11/2012 |
| WO | WO-2018223269 A1 * | 12/2018 |

OTHER PUBLICATIONS

Shenzhen Mindray Bio-Medical Electronics Co., Ltd., Chinese Office Action, CN Patent Application No. 202011322311.1, Mar. 28, 2025, 24 pgs.

Shenzhen Mindray Bio-Medical Electronics Co., Ltd., European Office Action, EP Patent Application No. 21209877.6, May 8, 2025, 9 pgs.

\* cited by examiner

ORTHOSTATIC HYPOTENSION MONITORING METHOD AND APPARATUS

CROSS-REFERENCE TO RELATED APPLICATIONS

This application claims the benefit of priority to Chinese Patent Application No. 202011322311.1, filed Nov. 23, 2020, the content of which is incorporated herein in its entirety.

TECHNICAL FIELD

The disclosure relates to the technical field of medical devices, and more particularly to an orthostatic hypotension monitoring method and an orthostatic hypotension monitoring apparatus.

BACKGROUND

Orthostatic hypotension (OH), also known as postural hypotension, is an abnormal phenomenon of blood pressure regulation, which is mainly manifested as dizziness, amaurosis, syncope and other uncomfortable symptoms after rapid standing. In clinical medicine, it is often necessary to assess the patient's orthostatic hypotension. For example, when new patients, especially the elderly patients who are prone to falls, are hospitalized in the general ward, the fall risk assessment needs to be carried out to determine whether corresponding measures need to be taken to prevent the patients from falling in the hospital. Orthostatic hypotension, as an important risk factor for the patients' falls, should be assessed.

At present, the clinical assessment of orthostatic hypotension mainly depends on the manual operation on the blood pressure measurement apparatus by the medical staff according to the operation guidelines, meanwhile the implementation of the assessment process is also manually controlled. Accordingly, the operation process is cumbersome and the assessment results may not be accurate due to human uncertainties.

SUMMARY

An orthostatic hypotension monitoring method and an orthostatic hypotension monitoring apparatus are provided for simplifying the operator's operation steps during the blood pressure monitoring process and improving the accuracy of monitoring results.

According to a first aspect of this disclosure, an orthostatic hypotension monitoring method is provided, which including:
  displaying a blood pressure monitoring interface, which includes operation instruction information that instructs to confirm a posture state of a monitored object;
  receiving a state confirmation instruction that is generated based on the operation instruction information;
  measuring physiological parameter data related to orthostatic hypotension of the monitored object, in response to the state confirmation instruction;
  acquiring an orthostatic hypotension monitoring result of the monitored object based on the physiological parameter data.

According to a second aspect of this disclosure, an orthostatic hypotension monitoring method is provided, which including:
  detecting whether a monitored object is in a stable first posture state;
  measuring first target physiological parameter data related to orthostatic hypotension of the monitored object in the first posture state, when detecting that the monitored object is in the stable first posture state;
  detecting whether the monitored object has changed from the first posture state to a second posture state;
  measuring second target physiological parameter data related to orthostatic hypotension of the monitored object in the second posture state, when detecting that the monitored object has changed from the first posture state to the second posture state;
  acquiring an orthostatic hypotension monitoring result of the monitored object based on the first target physiological parameter data and the second target physiological parameter data.

According to a third aspect of this disclosure, an orthostatic hypotension monitoring apparatus is provided, which including:
  a display configured to display a blood pressure monitoring interface, which includes operation instruction information that instructs to confirm a posture state of a monitored object;
  an input device configured to receive a state confirmation instruction that is generated based on the operation instruction information;
  a processor configured to measure physiological parameter data related to orthostatic hypotension of the monitored object, in response to the state confirmation instruction, and to acquire an orthostatic hypotension monitoring result of the monitored object based on the physiological parameter data.

According to a fourth embodiment of this disclosure, an orthostatic hypotension monitoring apparatus is provided, which including a processor and a memory mutually coupled, wherein the memory is configured to storing machine readable codes comprising instructions which enable the orthostatic hypotension monitoring apparatus to perform following operations when read from the memory and executed by the processor:
  detecting whether a monitored object is in a stable first posture state;
  measuring first target physiological parameter data related to orthostatic hypotension of the monitored object in the first posture state, when detecting that the monitored object is in the stable first posture state;
  detecting whether the monitored object has changed from the first posture state to a second posture state;
  measuring second target physiological parameter data related to orthostatic hypotension of the monitored object in the second posture state, when detecting that the monitored object has changed from the first posture state to the second posture state;
  acquiring an orthostatic hypotension monitoring result of the monitored object based on the first target physiological parameter data and the second target physiological parameter data.

It can be seen from the above technical scheme that the orthostatic hypotension monitoring method provided by the embodiments of this disclosure can display a blood pressure monitoring interface including operation instruction information used to instruct the operator to confirm the posture state of the monitored object, measure the physiological parameter data of the monitored object based on the confirmation instruction of the operator, and automatically obtain orthostatic hypotension monitoring result of the monitored object based on the physiological parameter data. Accordingly, such method can provide the operator with an auxiliary interface according with the orthostatic hypotension assessment process, such that the operator can complete the assessment process just based on the operation instructions. Accordingly, the operation process is simple and convenient, and the accuracy of the monitoring results is relatively high.

BRIEF DESCRIPTION OF THE DRAWINGS

The above and other objects, features and advantages of the disclosure will become more apparent from the description of embodiments of the disclosure in detail with reference to the accompanying drawings. The accompanying drawings, which are intended to provide a further understanding of embodiments of the disclosure and constitute a part of this specification, are intended to explain the disclosure together with the embodiments of the disclosure and not to limit the disclosure. For those skilled in the art, other drawings can be obtained from these accompanying drawings without paying any creative works.

DETAILED DESCRIPTION

In order to make the objects, technical solutions, and advantages of the disclosure more apparent, the example embodiments according to the disclosure will be described in detail below with reference to the accompanying drawings. Apparently, the embodiments described are merely some, rather than all, of the embodiments of the disclosure. It should be understood that the disclosure is not limited by the example embodiments described herein. All other embodiments derived by those skilled in the art without creative efforts on the basis of the embodiments of the disclosure described in the disclosure shall fall within the scope of protection of the disclosure.

In clinical medicine, in order to improve the assessment accuracy of orthostatic hypotension, some countries or regions have formulated standardized assessment criteria of orthostatic hypotension. Although the assessment criteria are widely used in clinic, there still is a lack of medical apparatus that can guide the operator to implement the orthostatic hypotension assessment process. The medical staff still needs to carry out the orthostatic hypotension assessment process according to the operation guidelines manually. For example, the blood pressure measurement steps and the related measurement time should be manually controlled. Moreover, whether orthostatic hypotension has occurred on the patient still should be assessed based on the blood pressure measurement results manually. Accordingly, the operation process of such assessment scheme is cumbersome and the assessment results may not be accurate due to human uncertainties.

In order to solve at least one of the above technical problems, the embodiment of this disclosure has provided an orthostatic hypotension monitoring method, which can guide the operator to complete the orthostatic hypotension assessment according to a standardized process. This method can be applied to an orthostatic hypotension monitoring apparatus. The operator can use this apparatus to monitor orthostatic hypotension, which can not only simplify the manual operation steps and improve the clinical operation efficiency, but also can provide accurate and reliable assessment results.

Figure 1:
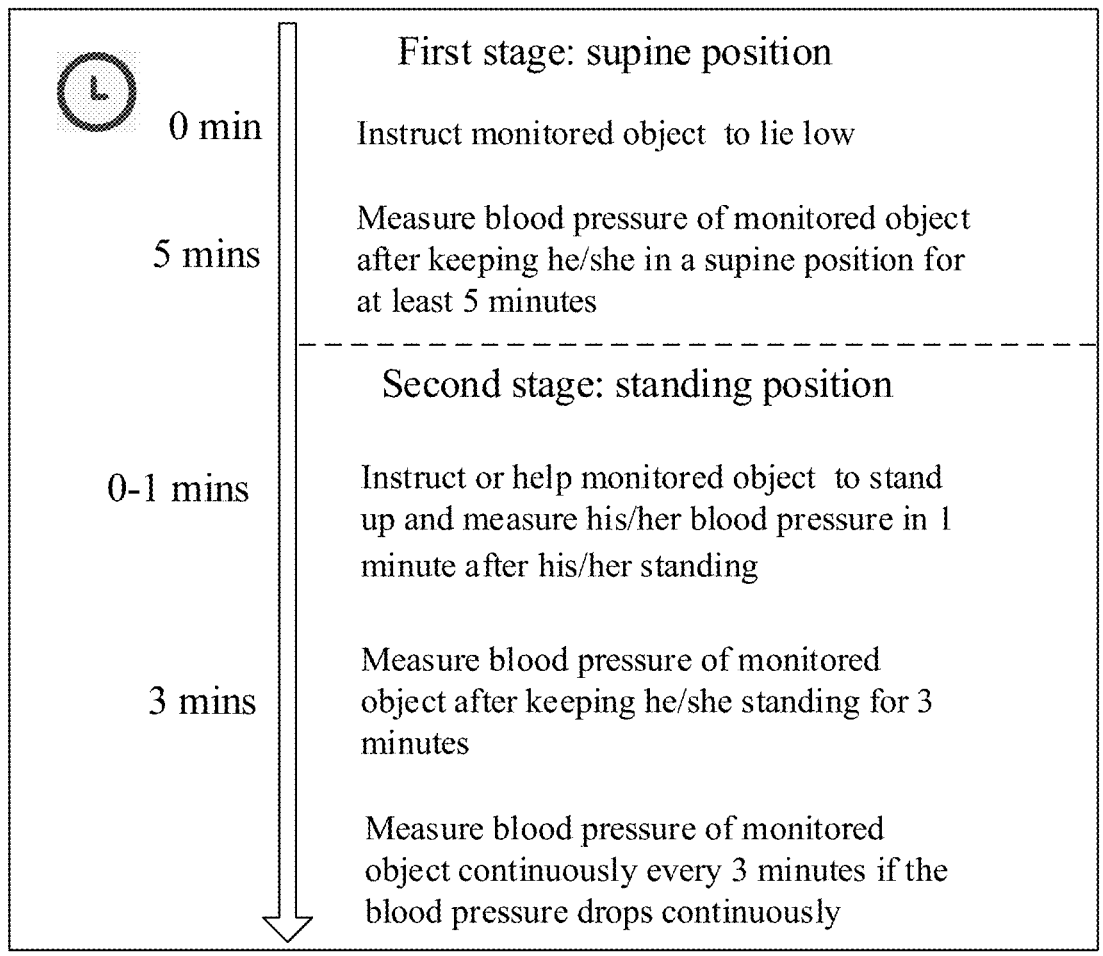
FIG. 1 shows a schematic orthostatic hypotension assessment process provided in accordance with an embodiment of the disclosure.

In order to understand the guidance of this monitoring method, firstly, the orthostatic hypotension assessment process is described as follows. For example, an assessment process, as shown in FIG. 1, includes two stages in a supine position and a standing position, respectively.

In the first stage, a supine blood pressure is measured.

The monitored object is instructed to lie low. Then the blood pressure of the monitored object is measured after keeping he/she in the supine position for at least 5 minutes.

In the second stage, a standing blood pressure is measured.

The monitored object is instructed to stand up or helped to stand up by the operator, and the blood pressure of the monitored object is measured in 1 minute after his/her standing. Then the blood pressure of the monitored object is measured again after keeping him/her standing for 3 minutes. If the blood pressure of the monitored object drops continuously, the blood pressure is measured continuously every 3 minutes.

Whether the monitored object has orthostatic hypotension can be assessed according to the blood pressure parameter data measured in different postures in the above two stages. It should be noted that the above assessment process is only an example, and the postures and time duration requirements of the monitored object can be set differently according to the medical assessment requirements.

Based on the above brief introduction to orthostatic hypotension, the technical scheme of the embodiment of this disclosure is described in detail below.

Figure 2:
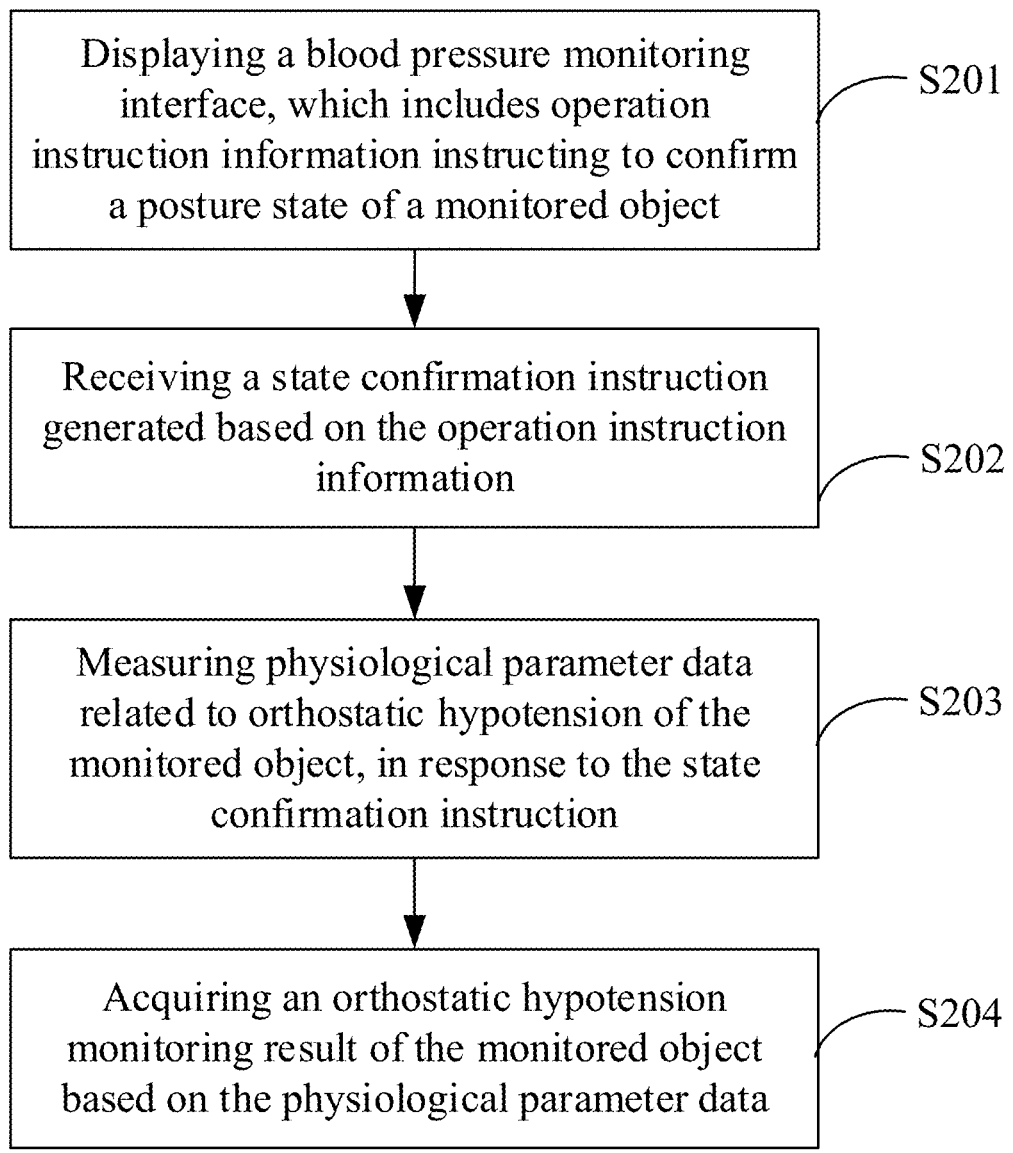
FIG. 2 shows a schematic diagram of an orthostatic hypotension monitoring method in accordance with an embodiment of the disclosure.

Referring FIG. 2, an orthostatic hypotension monitoring method in accordance with an embodiment of the disclosure has been disclosed, which specifically includes following steps S201-S204.

In step S201, a blood pressure monitoring interface, which includes operation instruction information that instructs to confirm a posture state of a monitored object, is displayed.

Among them, the blood pressure monitoring interface can be a part of a main monitoring interface, or a display interface independent of the main monitoring interface but associated with the main monitoring interface in a suspension mode, embedded mode, hidden mode and so on.

Based on the above description, it can be seen that the orthostatic hypotension assessment requires to measure the physiological parameter data of the monitored object in different postures. In order to simplify the operation process of the operator, operation instruction information can be given on the blood pressure monitoring interface to instruct the operator to confirm the posture state of the monitored object. It should be noted that since the assessment process may have clear requirements for whether the posture state of the monitored object is stable and for the change of the posture state, the operation instruction information can specifically instruct the operator to confirm the above posture conditions of the monitored object.

In one embodiment, the operation instruction information may specifically include at least one of the following: a first instruction information that instructs to confirm whether the monitored object is in a stable first posture state; a second instruction information that instructs to confirm whether the monitored object has changed from the first posture state to a second posture state.

In step S202, a state confirmation instruction generated based on the operation instruction information is received.

In order to achieve the instruction effect, the operation instruction information can specifically include a confirmation requirement of a posture condition. It can be understood that if the posture condition of the monitored object does not satisfy the confirmation requirement contained in the operation instruction information, the operator cannot confirm until the posture condition of the monitored object satisfies the confirmation requirement. Then the operator inputs the state confirmation instruction.

For example, the operation instruction information may include a confirmation control or a cancellation control. Triggering the confirmation control indicates inputting the state confirmation instruction. Of course, the state confirmation instruction can also be inputted in the form of voices, operating physical keys, etc., which is not specifically limited in the present disclosure.

In step S203, in response to the state confirmation instruction, physiological parameter data related to orthostatic hypotension of the monitored object is measured.

Once the operator inputs the state confirmation instruction, the measurement process of the physiological parameter data would start. It can be understood that the measured physiological parameter data are parameter data related to orthostatic hypotension, such as diastolic blood pressure, systolic blood pressure, heart rate, pulse, etc. The specific measurement process of physiological parameter data is not described here for simplicity.

Physiological parameter data can be displayed on the blood pressure monitoring interface or not. If the physiological parameter data is displayed, the posture state corresponding to the physiological parameter data, such as the standing state or supine state, can also be displayed.

In step S204, an orthostatic hypotension monitoring result of the monitored object is acquired based on the physiological parameter data.

Specifically, the orthostatic hypotension monitoring result, which can be YES or NO, can be acquired by calculating the physiological parameter data in different posture states, and further displayed on the blood pressure monitoring interface.

Physiological parameter data can be divided into physiological parameter data in a supine position or physiological parameter data in a standing position respectively, and such physiological parameter data can include diastolic blood pressure, systolic blood pressure and heart rate.

One calculation method is as follows. If the physiological parameter data satisfies a first requirement, a second requirement or a third requirement, the orthostatic hypotension monitoring result of the monitored object is determined as YES.

Wherein, the first requirement refers to that a decreased value between a systolic blood pressure in the standing position and a systolic blood pressure in the supine position is greater than or equal to a first threshold; the second requirement refers to that the systolic blood pressure in the standing position is less than a second threshold; while the third requirement refers to that a decreased value between a diastolic blood pressure in the standing position and a diastolic blood pressure in the supine position is greater than or equal to a third threshold and a hypotension symptom, such as blood dizziness, dizziness, etc., occurs. It should be noted that the hypotension symptom is a symptom that may occur after the monitored object has changed from one posture state to another posture state. This symptom can be automatically determined according to the physiological parameter data, or manually inputted by the operator according to the observed situation of the monitored object. Hypotension symptom can be stored together with the physiological parameter data.

For example, if the blood pressure value of the monitored object satisfies one of the following requirements, it can be assessed that orthostatic hypotension occurs. The systolic blood pressure in the standing position decreases for 20 mmHg or more relative to the systolic blood pressure in the supine position. The systolic blood pressure in the standing position decreases for less than 20 mmHg, but reaches 90 mmHg or less. The diastolic blood pressure in the standing position decreases for 10 mmHg or more relative to the diastolic blood pressure in the supine position, and meanwhile a hypotension symptom occurs.

Another one calculation method is as follows. If the physiological parameter data satisfies a fourth requirement, a fifth requirement or a sixth requirement, the orthostatic hypotension monitoring result of the monitored object is determined as YES.

Wherein, the fourth requirement refers to that a decreased value between a systolic blood pressure in the standing position and a systolic blood pressure in the supine position is greater than or equal to a fourth threshold; the fifth requirement refers to that a decreased value between a diastolic blood pressure in the standing position and a diastolic blood pressure in the supine position is greater than or equal to a fifth threshold; while the sixth requirement refers to that an increased value between a standing heart rate and a supine heart rate is greater than or equal to a sixth threshold.

For example, if the blood pressure value or the heart rate value of the monitored object satisfies one of the following requirements, it can be assessed that orthostatic hypotension occurs. The systolic blood pressure in the standing position decreases for 20 mmHg or more relative to the systolic blood pressure in the supine position. The diastolic blood pressure in the standing position decreases for 10 mmHg or more relative to the diastolic blood pressure in the supine position. The standing heart rate increases for 20 bpm or more relative to the supine heart rate.

It should be noted that the orthostatic hypotension may have a variety of assessment criteria, and different criteria may be adopted by different countries or regions. The above two criteria are described in this disclosure as examples. The assessment criteria of the orthostatic hypotension can be others, such as definitions about decrease thresholds of the systolic blood pressure, the diastolic blood pressure, the average blood pressure, or increase threshold of the heart rate, or symptoms, and so on, which are not specifically limited in the present disclosure.

The specific values of the first threshold, the second threshold, the third threshold, the fourth threshold, the fifth threshold and the sixth threshold can refer to the values recited in the above hypotension assessment criteria, or can adopt other thresholds.

It can be seen from the above technical scheme that the orthostatic hypotension monitoring method provided by the embodiments of this disclosure can display a blood pressure monitoring interface including operation instruction information used to instruct the operator to confirm the posture state of the monitored object, measure the physiological parameter data of the monitored object based on the confirmation instruction of the operator, and automatically obtain orthostatic hypotension monitoring result of the monitored object based on the physiological parameter data. Accordingly, such method can provide the operator with an auxiliary interface according with the orthostatic hypotension assessment process, such that the operator can complete the assessment process just based on the operation instructions. Accordingly, the operation process is simple and convenient, and the accuracy of the monitoring results is relatively high.

The specific implementation of the operation instruction information and the physiological parameter data measurement process performed based on the operation instruction information are described below in combination with FIG. 3A.

Corresponding to the first phase of the assessment process shown in FIG. 1, the operation instruction information may include a first instruction information that instructs an operator to confirm whether the monitored object is in a stable first posture state. Specifically, the first instruction information may include an instruction information that instructs to confirm whether the monitored object is in a first posture state, and an instruction information that instructs to confirm a time duration that the monitored object is in the first posture state.

Figure 3A:
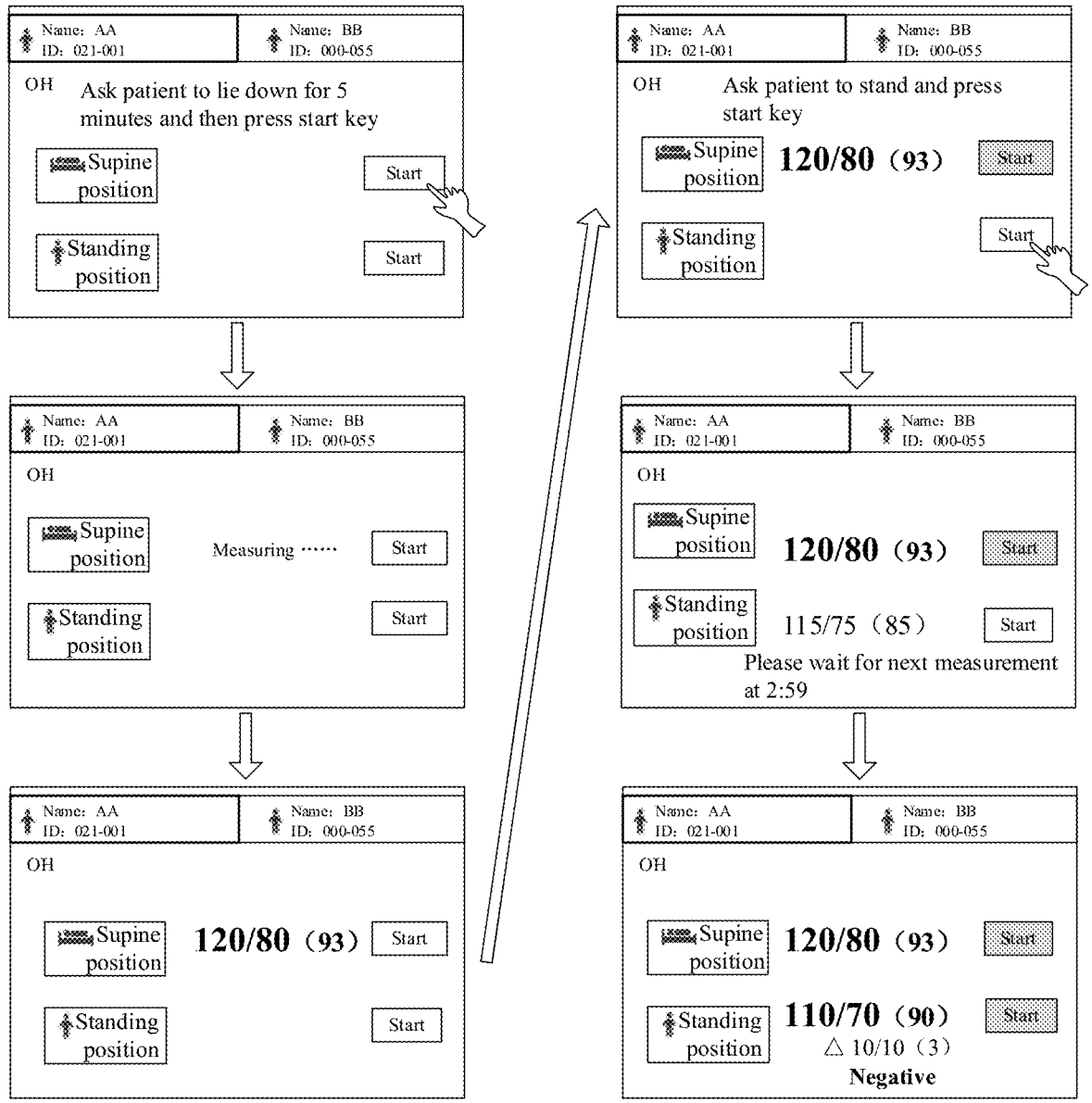
FIG. 3A shows a group of schematic diagrams of a blood pressure monitoring interface in accordance with an embodiment of the disclosure.

FIG. 3A has shown a specific example of a blood pressure monitoring interface, which can display information of the monitored object, such as name, number, etc. If the orthostatic hypotension monitoring is required for multiple monitored objects, the blood pressure monitoring interface can display information cards of the multiple monitored objects, and the operator can select one information card to determine the current monitored object. As shown in FIG. 3A, when a monitored object named AA is selected as the current monitored object, the blood pressure monitoring interface instructs the operator to measure a supine blood pressure of the monitored object. For example, the blood pressure monitoring interface displays an operation instruction text "ask the patient to lie down for 5 minutes and then press the start key" (that is, the first instruction information). Based on the operation instruction text, the operator can instruct the monitored object or help the monitored object to lie down, and then press the start key after that the monitored object has lain for 5 minutes to measure physiological parameter data such as blood pressure of the monitored object being in a supine position stably. This method may require the operator to manually time for a time duration satisfying the time length requirement, and then manually trigger the physiological parameter data acquisition process. It can be seen that whether the posture state is stable can be determined according to the time duration of the posture state. Of course, the time duration of the operator for pressing the start key cannot be limited to the instructed time duration, but also can be determined flexibly according to the confirmation about whether the posture state is stable made by the operator according to his/her own observation of the monitored object.

In order to further simplify the operator's operation steps, automatic timing and automatic measurement can be carried out. That is, start timing in response to the state confirmation instruction inputted based on the first instruction information. When the timing duration reaches a preset duration value, object physiological parameter data related to orthostatic hypotension of the monitored object in the first posture state, such as the supine position, is measured. In order to distinguish from the object physiological parameter data measured in the second posture state, the object physiological parameter data in the first posture state can be called as first target physiological parameter data.

Figure 3B:
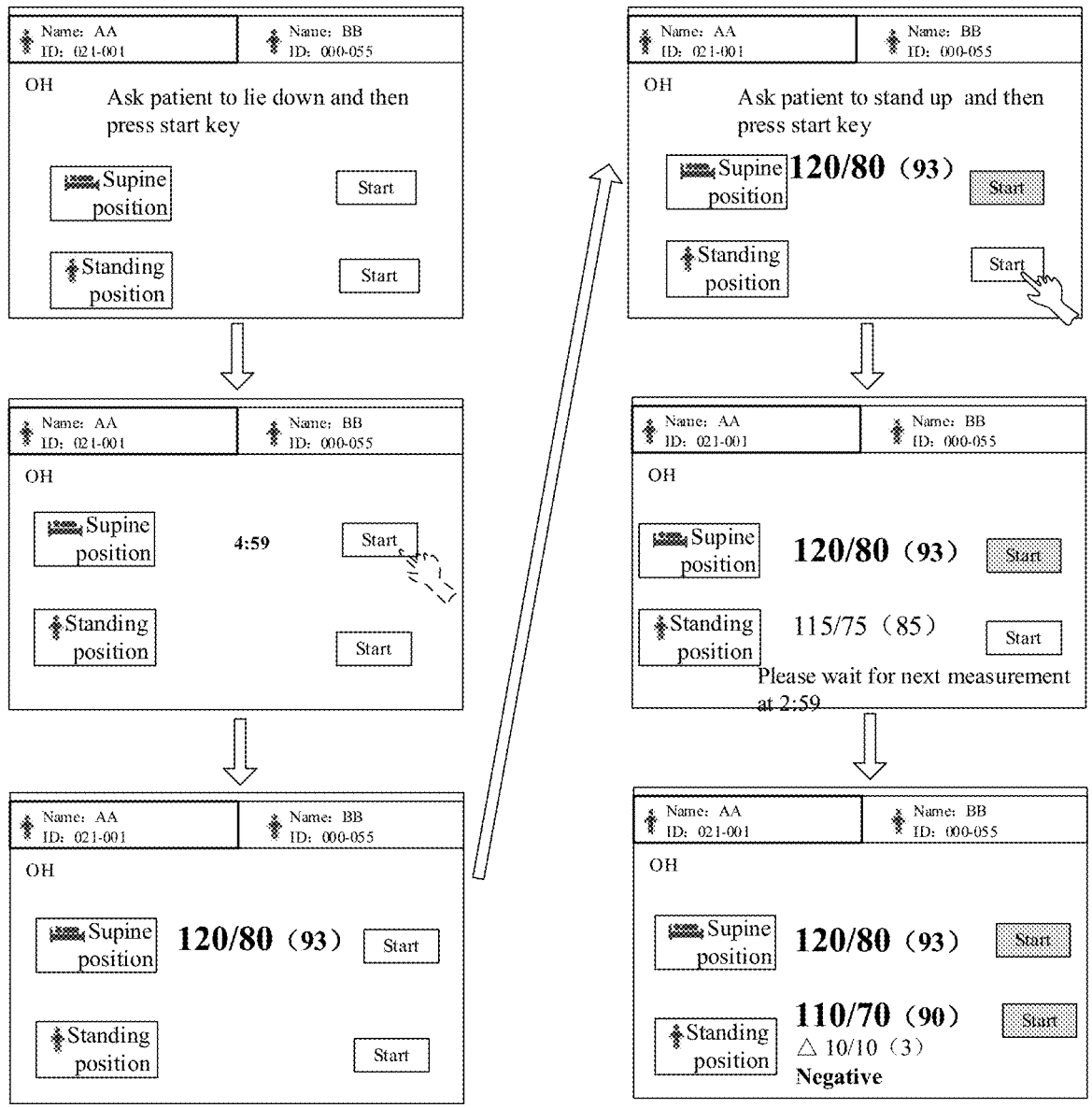
FIG. 3B shows another group of schematic diagrams of a blood pressure monitoring interface in accordance with an embodiment of the disclosure.

Combined with FIG. 3B, another implementation method of the first instruction information is that the blood pressure monitoring interface displays an operation instruction text "ask the patient to lie down and then press the start key". As shown in the second figure of FIG. 3B, after the start key has been pressed by the operator, the orthostatic hypotension monitoring method automatically starts timing, and automatically measures the physiological parameter data such as the blood pressure after reaching a preset timing length, such as 5 minutes. The blood pressure monitoring interface can display the timing duration, such as in a form of countdown or positive timing, to instruct the operator to monitor the timing duration of the monitored object in the supine position. Alternatively, the blood pressure monitoring interface may not display the timing duration.

Alternatively, in order to improve the operation flexibility, as shown in the second figure of FIG. 3B, the operator can press the start key after confirming that the monitored object is in a stable posture state according to his/her own observation of the monitored object, thus independently starting the measurement of physiological parameter data, such as the blood pressure. In this way, the operator can independently determine the measurement time of physiological parameter data according to his/her own observation of the monitored object about whether the posture state of the monitored object is stable, without being limited by the timing duration preset by the system. In such a way, a higher flexibility can be obtained.

It can be seen that no matter what form of first instruction information is provided on the blood pressure monitoring interface, after receiving the state confirmation instruction about the first posture state of the monitored object inputted by the operator based on the first instruction information, the orthostatic hypotension monitoring apparatus can respond to the state confirmation instruction and measure the first target physiological parameter data related to orthostatic hypotension of the monitored object in the first posture state. Furthermore, the blood pressure monitoring interface can display the first target physiological parameter data. As shown in FIG. 3A and FIG. 3B, the blood pressure monitoring interface displays a supine position icon, and further displays the blood pressure and other physiological parameter data measured in the supine position at an interface position corresponding to the supine position icon.

After completing the physiological parameter data measurement of the first posture state, the operator can be sequentially instructed to measure physiological parameter data of the second posture state of the monitored object.

Corresponding to the second stage of the assessment process shown in FIG. 1, "the monitored object is instructed to stand up or helped to stand up by the operator, and the blood pressure of the monitored object is measured in 1 minute after his/her standing", the blood pressure monitoring interface can include a second instruction information that instructs the operator to confirm whether the monitored object has changed from the first posture state to a second posture state. Based on the second instruction information, the operator can input the state confirmation instruction and measure the object physiological parameter data related to orthostatic hypotension of the monitored object in the second posture state in response to the state confirmation instruction. In order to distinguish from the object physiological parameter data measured in the first posture state, the object physiological parameter data in the second posture state can be called as second target physiological parameter data.

It should be noted that the second target physiological parameter data refer to the physiological parameter data when the monitored object is in a second posture state stably. Since the physiological parameter data may change significantly in the earlier time period after the monitored object has just changed from the first posture state to the second posture state, in order to acquire the physiological parameter data in a stable state, one way is to wait for a preset time period after the monitored object has changed to the second posture state, while a second way is to monitor changes of physiological parameter data until the physiological parameter data no longer changes. Of course, the second target physiological parameter data can also be measured in other ways. The second way of object physiological parameter data measurement is described in detail below.

Physiological parameter data related to orthostatic hypotension are monitored in multiple time periods after the monitored object has changed from the first posture state to the second posture state. When an amplitude of change of the physiological parameter data in adjacent time periods is less than a preset threshold, the second posture state of the monitored object has been stable, so the physiological parameter data with the amplitude of change less than the preset threshold can be determined as the second target physiological parameter data. More specifically, the above mentioned scheme can be realized in the following ways.

Once the monitored object has changed from the first posture state to the second posture state, the physiological parameter data related to orthostatic hypotension is measured. This is corresponding to the second stage shown in FIG. 1 that "the monitored object is instructed to stand up or helped to stand up by the operator, and the blood pressure of the monitored object is measured in 1 minute after his/her standing". This measurement result can be used as the first physiological parameter data in the second posture state. The second physiological parameter data monitored in the second time is compared with the first physiological parameter data to monitor whether the physiological parameter data has changed. It should be noted that the first physiological parameter data can be measured within 1 minute or within other time durations (such as 10 seconds, 20 seconds, etc.) after the first posture state has changed to the second posture state. In additional, the first physiological parameter data can be displayed on the blood pressure monitoring interface to instruct the operator.

Then, according to the preset time interval, the physiological parameter data related to orthostatic hypotension after the monitored object has been in the second posture state is measured for multiple times. Compare the physiological parameter data measured each time with the physiological parameter data measured last time to calculate an amplitude of change of the physiological parameter data. Then determine whether the amplitude of change is less than the preset threshold. When the amplitude of change is less than the preset threshold, the last physiological parameter data or the average value of the last two physiological parameter data whose change amplitude is less than the preset threshold, is taken as the second target physiological parameter data. This process can correspond to the second stage in FIG. 1 that, "the blood pressure of the monitored object is measured again after keeping he/she standing for 3 minutes; and if the blood pressure of the monitored object drops continuously, the blood pressure is measured continuously every 3 minutes".

As shown in FIG. 3A and FIG. 3B, after the blood pressure measurement in the supine position is completed, the blood pressure monitoring interface displays an instruction text "ask the patient to stand and press the start key" (that is, the second instruction information). Based on the instruction text, the operator can instruct the monitored object or help the monitored object to stand and press the start key. In order to further indicate that the blood pressure measurement in the supine position has been completed, its corresponding start key can become untouchable, for example, turning gray. The physiological parameter data of the patient acquired in the first measurement after his/her standing can be displayed in the blood pressure monitoring interface, such as "110/70 (85)". In order to instruct the operator that further measurement data is required to determine whether the second posture state is stable, an instruction text "please wait for the next measurement" is displayed on the blood pressure monitoring interface. Three-minute countdown starts and is displayed on the blood pressure monitoring interface in real time. The blood pressure and other physiological parameter data are measured every three minutes, and the new measurement results replace the previous measurement results and are displayed on the blood pressure monitoring interface. When the blood pressure and other physiological parameter data no longer change the last measured physiological parameter data will be displayed.

After acquiring the first target physiological parameter data and the second target physiological parameter data, a trend of change and/or difference of change between the first target physiological parameter data and the second target physiological parameter data are calculated. Then the trend of change and/or difference of change are displayed. Among them, the trend of change includes increase or decrease. As shown in the last figure in FIG. 3A and FIG. 3B, the triangular icon represents the change situation of the two measurement results, while the specific value displayed behind the triangular icon refers to the difference of change.

It can be understood that the first target physiological parameter data is the measurement result in the first posture state, and the second target physiological parameter data is the measurement result in the second posture state. The trend of change and difference of change of the two measurement results are calculated and displayed to the operator, so that the operator can understand the specific situation of the physiological parameter data of the monitored object, and verify the assessment results of orthostatic hypotension according to the displayed content.

Further, after being calculated according to any of the above orthostatic hypotension calculation methods, the assessment result can be displayed on the blood pressure monitoring interface. If the assessment result is that orthostatic hypotension occurs, a positive result is displayed, while if the assessment result is that orthostatic hypotension never occurs, a negative result is displayed, just as shown in the last figure in FIG. 3A and FIG. 3B.

Figure 4:
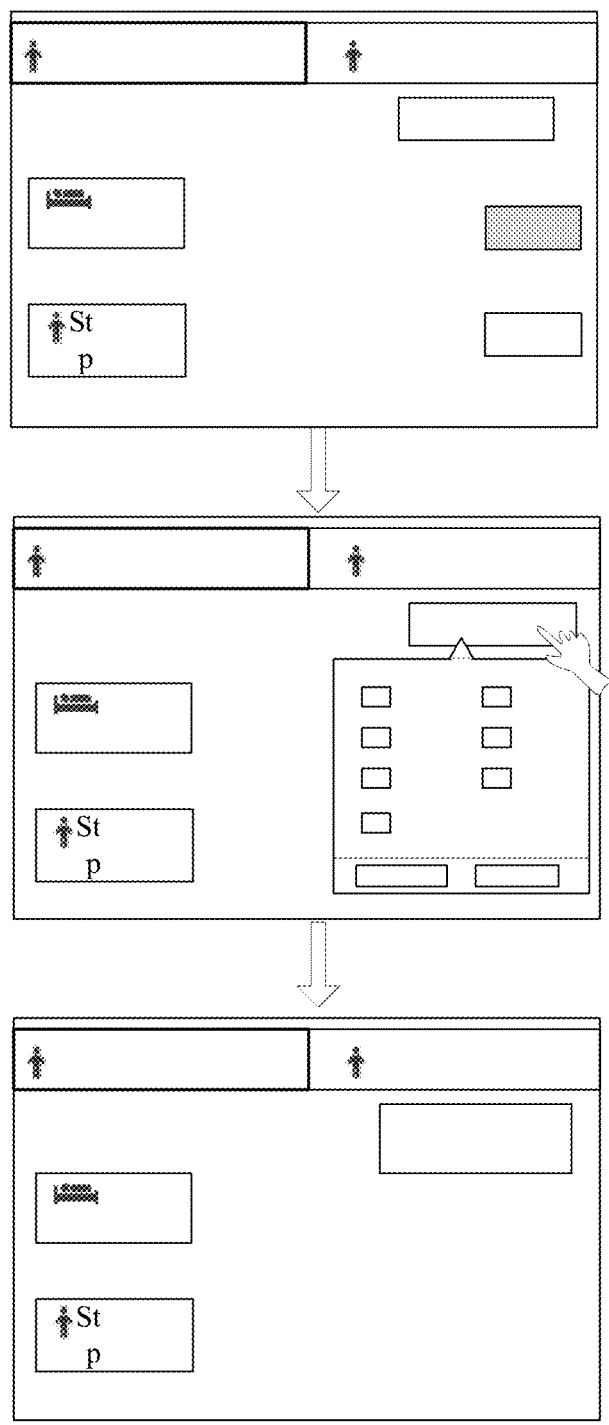
FIG. 4 shows a group of schematic diagrams of inputting hypotension symptoms in accordance with an embodiment of the disclosure.

It should be noted that when the monitored object changes from the first posture state to the second posture state, hypotension symptoms may occur. Hypotension symptoms can be automatically detected by the orthostatic hypotension monitoring apparatus or inputted by the operator through the blood pressure monitoring interface. As shown in FIG. 4, the blood pressure monitoring interface can include a symptom control. After triggering the control by the operator, a symptom selection interface including at least one hypotension symptom selection item pops up. The operator can select one or more options according to the observation of the monitored object. The orthostatic hypotension monitoring apparatus can record these hypotension symptoms, and comprehensively assess the orthostatic hypotension according to the hypotension symptoms. Furthermore, the orthostatic hypotension monitoring apparatus can also provide hypotension symptom editing functions, that is, the operator can customize the hypotension symptoms in the symptom selection interface, such as deletion, addition or modification.

Figure 5:
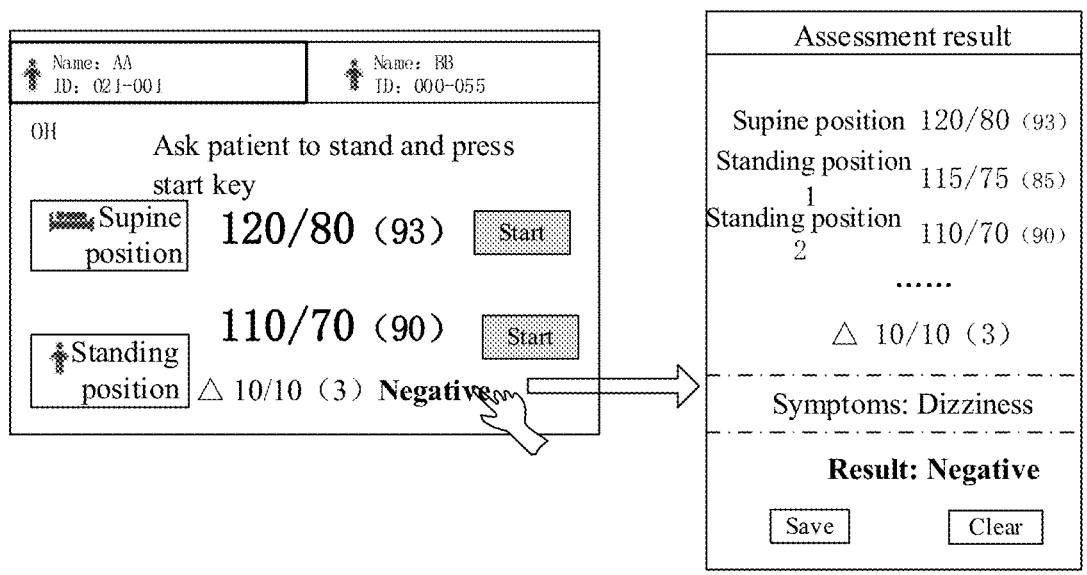
FIG. 5 shows a group of schematic diagrams for viewing monitoring results of orthostatic hypotension in accordance with an embodiment of the disclosure.

In practical application, the operator may need to view the assessment process of orthostatic hypotension. Therefore, the orthostatic hypotension monitoring apparatus can provide an interface so that the operator can view the assessment result interface. The assessment result interface can include various physiological parameter data measured in the assessment process, recorded symptoms of the monitored object and assessment results. As shown in FIG. 5, the operator can trigger an assessment result control, and then the orthostatic hypotension monitoring apparatus displays the assessment result interface, so the operator can choose to save the assessment result or clear the assessment result.

It should be noted that the preset values in various embodiments of this disclosure, such as timing duration, preset thresholds for determining the amplitude of change, alarm thresholds, time intervals, etc., can be customized by the operator in advance or adjusted according to actual needs and are not limited in the disclosure. In addition, at least one of the first requirement, the second requirement and the third requirement is defined by a parameter inputted by the user. At least one of the fourth requirement, the fifth requirement and the sixth requirement is defined by a parameter inputted by the user. The content which can be defined by a parameter inputted by the user in the requirements can include thresholds associated with the requirements and so on. In one embodiment, the first posture state and/or the second posture state may also be defined according to the user's inputted instruction.

In the orthostatic hypotension monitoring method provided by the above embodiments, the operator needs to input at least one confirmation instruction to the orthostatic hypotension monitoring apparatus based on the operation instruction information on the blood pressure monitoring interface. In order to further simplify the operation action of the operator, a further embodiment of this disclosure provides an orthostatic hypotension monitoring method to realize an automatic monitoring of orthostatic hypotension.

Figure 6:
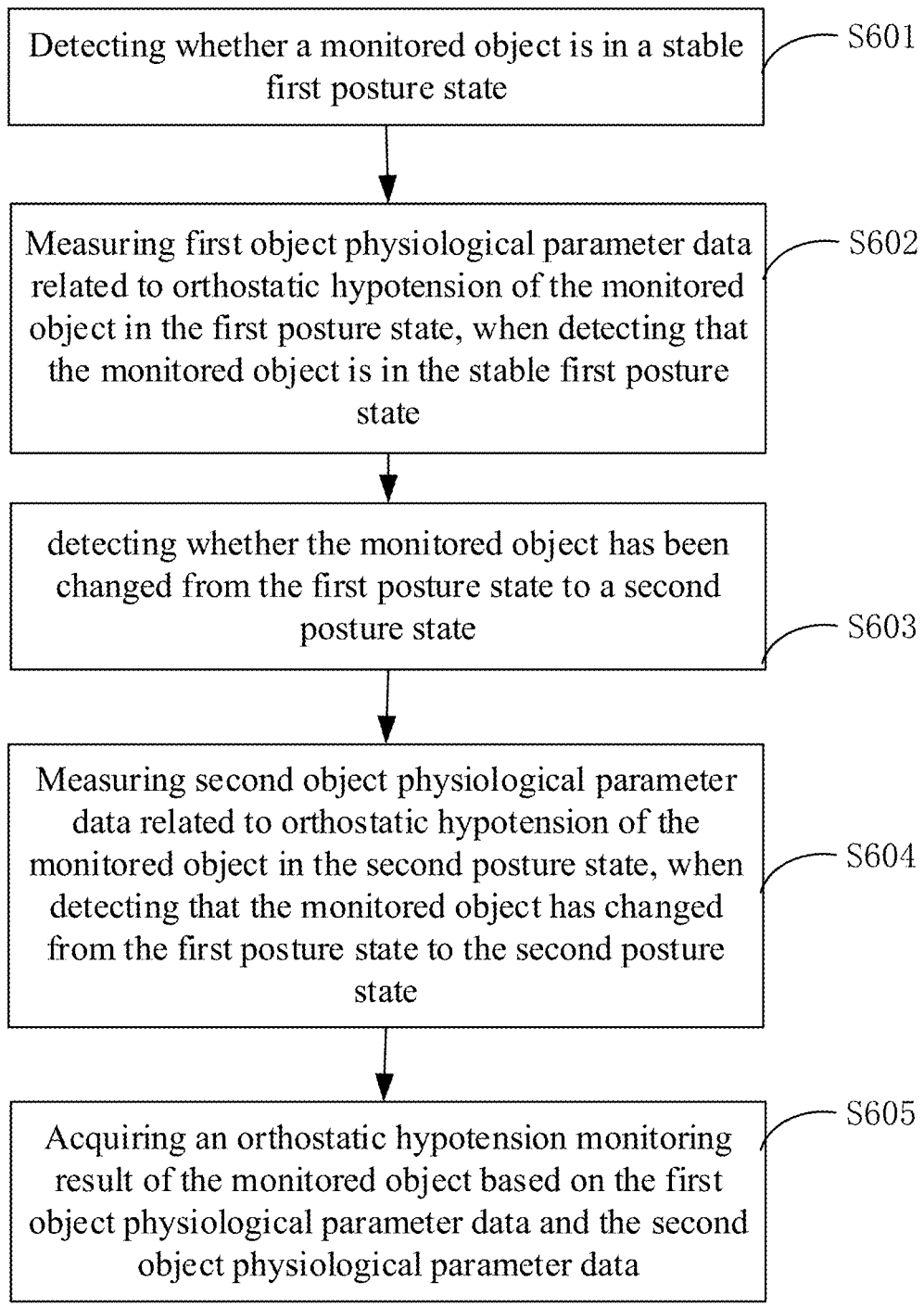
FIG. 6 shows another schematic diagram of an orthostatic hypotension monitoring method in accordance with an embodiment of the disclosure.

Referring to FIG. 6, an orthostatic hypotension monitoring method according to a specific embodiment of the present disclosure can comprise steps S601-S605.

In step S601, whether a monitored object is in a stable first posture state is detected.

Based on the above description, it is necessary to use physiological parameter data of the monitored object in different posture states to assess whether orthostatic hypotension occurs on the monitored object. Therefore, when the orthostatic hypotension monitoring method is started, it can automatically detect that whether the monitored object is in a stable first posture state (wherein, the first posture state refers to a preset posture state).

In one implementation, whether the monitored object is in a first posture state is firstly detected, and then whether the first posture state of the monitored object is stable is detected. For example, whether it is stable can be determined by monitoring the time duration that the monitored object is in the first posture state, fluctuation of the first posture state, and so on.

For example, video image data of the monitored object can be acquired, and then whether a posture state of the monitored object is in a stable first posture state can be recognized according to the video image data. Specifically, by using image recognition technology, the monitored object is recognized from each frame of video image data, and the posture state of the monitored object in each frame of video image data is recognized. If it is recognized from multiple frames of video image data that the monitored object has maintained the first posture state for a time duration which satisfies a preset time duration, or the fluctuation of the first posture state is small, then the monitored object is determined to be in the stable first posture state. This implementation requires video image data with a large number of frames for the image recognition, so the determination result is more accurate.

As another example, video image data of the monitored object can be acquired, and then whether the monitored object is in a first posture state can be recognized according to the video image data. When the monitored object is in the first posture state, a time duration of the monitored object in the first posture state is acquired. Then whether the time duration satisfies a preset time duration is detected. Different from the previous implementation method, the present implementation method no longer recognizes the video image data, but starts a timer, after determining that the monitored object is in the first posture state according to one or more frames of the video image data. When the timing duration satisfies the preset timing duration, the monitored object is determined to be in the stable first posture state.

In addition to using the image recognition technology to determine the posture state, in another embodiment, a detection result of an intelligent hospital bed device with a detection function can also be used. Specifically, a detection instruction is sent to a hospital bed device to enable it to detect a posture state of the monitored object and then return a posture state detection result. Whether the monitored object is in a stable first posture state is determined according to the posture state detection result. For example, the first posture state is the supine position state, and the bed surface of the hospital bed device is provided with detection components such as a pressure sensor. After the posture hypotension monitoring method is started, a detection instruction can be sent to the hospital bed device to enable it to measure the bed surface pressure and other parameter values, and determine whether the monitored object is in the supine position state and whether the supine position state is stable based on the measured parameter values.

In step S602, if the monitored object is in the stable first posture state, then first target physiological parameter data related to orthostatic hypotension of the monitored object in the first posture state, is measured.

If the detection result indicates that the monitored object is in the stable first posture state, then the physiological parameter data measurement of the monitored object can be started. The specific measurement process may refer to the description of the embodiments shown in FIG. 2, which is not repeated here for simplicity.

In step S603, whether the monitored object has changed from the first posture state to a second posture state is detected.

Wherein, whether the first posture state of the monitored object changes and whether the first posture state of the monitored object changes to a preset second posture state, are detected. Similar as these discussed for the first posture state, such detection can realized by image recognition or intelligent hospital bed detection, specifically.

In one implementation method, video image data of the monitored object can be acquired, and then whether the monitored object is in a second posture state can be recognized according to the video image data. This implementation method determines the posture state of the monitored object through recognizing each frame of the video image data.

In another implementation method, a detection instruction is sent to a hospital bed device to enable it to detect a posture state of the monitored object and then return a posture state detection result. Whether the monitored object is in a second posture state is detected according to the posture state detection result. For example, the second posture state is the standing position state, and the hospital bed device is provided with a feet-standing structure arranged with a detection unit, such as a pressure sensor, arranged on its structure surface. If parameters such as pressure values satisfies a preset requirement are detected, it can be determined that the monitored object has changed to the second posture state.

In step S604, second target physiological parameter data related to orthostatic hypotension of the monitored object in the second posture state is measured, if the monitored object has changed from the first posture state to the second posture state.

Among them, if the detection result is that the monitored object has changed from the first posture state to the second posture state, the physiological parameter data measurement of the monitored object can be started. The specific measurement process may refer to the description of the embodiments shown in FIG. 2, which is not repeated here for simplicity.

In step S605, an orthostatic hypotension monitoring result of the monitored object is acquired based on the first target physiological parameter data and the second target physiological parameter data.

Among them, the orthostatic hypotension assessment process can refer to the above description, which is not repeated here for simplicity. The object physiological parameter data and the orthostatic hypotension monitoring results can be displayed on the blood pressure monitoring interface.

It can be seen from the above technical scheme that the orthostatic hypotension monitoring method provided by the embodiment of this disclosure can automatically detect the posture state of the monitored object, automatically start the physiological parameter data measurement when the detection results satisfy the posture state requirements, and finally assess whether orthostatic hypotension occurs according to the physiological parameter data of different posture states. This monitoring process can further simplify the operator's operation and make the operator's experience better. It should be noted that in the above monitoring method, it's not like the operator does not perform any operation at all, instead in some embodiments, he/she can input a small number of triggering operations, such as starting countdown, etc.

Figure 7:
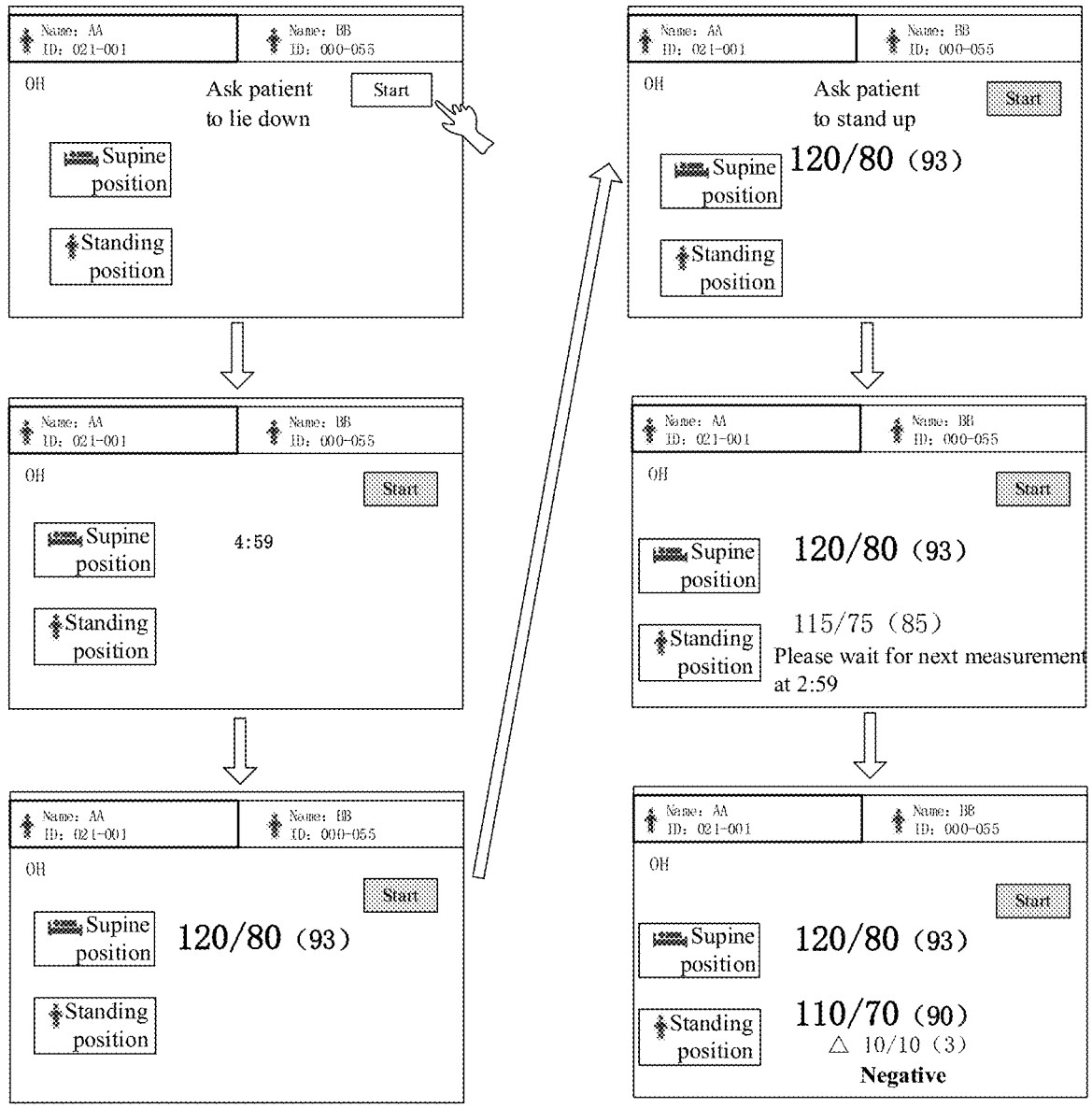
FIG. 7 shows a further group of schematic diagrams of a blood pressure monitoring interface in accordance with an embodiment of the disclosure.

Referring FIG. 7, it provides a group of schematic diagrams of the blood pressure monitoring interface. The blood pressure monitoring interface includes a start control, by triggering which the operator can start the orthostatic hypotension monitoring method. The blood pressure monitoring interface displays an operation instruction text "ask the patient to lie down". After detecting that the monitored object has been in a supine position, 5-minute countdown is started. After the countdown, the blood pressure and other parameter values are measured and displayed at an interface position corresponding to the supine position icon. Then the blood pressure monitoring interface displays an operation instruction text "ask the patient to stand up". After detecting that the monitored object has been in a standing position, the blood pressure and other parameter values are measured for once. Then the blood pressure and other parameter values are measured repeatedly every 3 minutes until the changes of the blood pressure and other parameter values satisfy a preset requirement. Then the parameter value measurement results of the standing position are displayed at an interface position corresponding to the standing position icon. Based on the measurement results of physiological parameters in the two posture states, the orthostatic hypotension assessment result can be acquired.

In order to ensure the application and realization of the above method in practice, this disclosure has further provided an orthostatic hypotension monitoring apparatus, such as a blood pressure measuring apparatus, other medical apparatuses with blood pressure measuring function, or electronic apparatuses providing blood pressure monitoring function, and so on.

Figure 8:
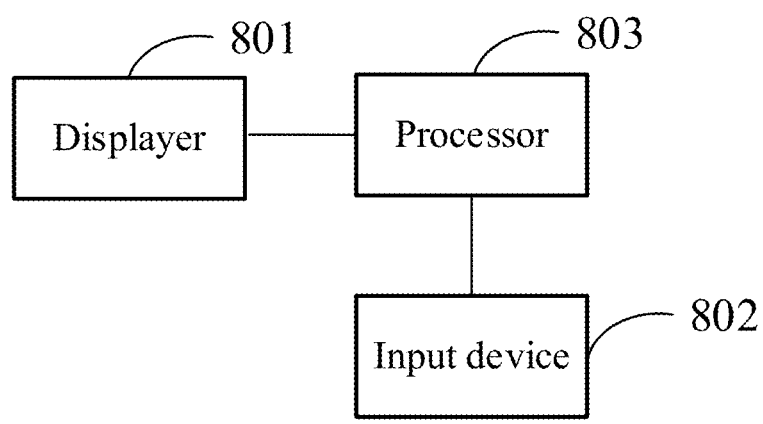
FIG. 8 shows a schematic structural diagram of an orthostatic hypotension monitoring apparatus in accordance with an embodiment of the disclosure.

As shown in FIG. 8, an orthostatic hypotension monitoring apparatus according to an embodiment of the present disclosure can include a display 801, an input device 802 and a processor 803 coupled with the display 801 and input device 802.

The display 801 is configured to display a blood pressure monitoring interface, which includes operation instruction information that instructs to confirm a posture state of a monitored object.

The input device 802 is configured to receive a state confirmation instruction that is generated based on the operation instruction information. For example, the input device 802 and the display 801 can be integrated into a touch screen.

The processor 803 is configured to measure physiological parameter data related to orthostatic hypotension of the monitored object, in response to the state confirmation instruction and to acquire an orthostatic hypotension monitoring result of the monitored object based on the physiological parameter data.

In one embodiment, the operation instruction information may specifically include at least one of the following: a first instruction information that instructs to confirm whether the monitored object is in a stable first posture state; a second instruction information that instructs to confirm whether the monitored object has changed from the first posture state to a second posture state.

In one embodiment, the first instruction information may include an instruction information that instructs to confirm whether the monitored object is in a first posture state, and an instruction information that instructs to confirm a time duration that the monitored object is in the first posture state.

In one embodiment, to measure physiological parameter data related to orthostatic hypotension of the monitored object, in response to the state confirmation instruction, the first processor 803 is specifically configured to start timing in response to the state confirmation instruction inputted based on the first instruction information, wherein the state confirmation instruction is inputted based on the instruction information that instructs to confirm whether the monitored object is in a first posture state in the first instruction information.

In one embodiment, the display 801 is further configured to display the timing duration on the blood pressure monitoring interface.

In one embodiment, to measure physiological parameter data related to orthostatic hypotension of the monitored object, in response to the state confirmation instruction, the processor 803 is specifically configured to measure first target physiological parameter data related to orthostatic hypotension of the monitored object in the first posture state, in response to a state confirmation instruction inputted based on the first instruction information.

In one embodiment, to measure physiological parameter data related to orthostatic hypotension of the monitored object, in response to the state confirmation instruction, the processor 803 is specifically configured to measure second target physiological parameter data related to orthostatic hypotension of the monitored object in the second posture state, in response to a state confirmation instruction inputted based on the second instruction information.

In one embodiment, to measure second target physiological parameter data related to orthostatic hypotension of the monitored object in the second posture state, the processor 803 is specifically configured to monitor physiological parameter data related to orthostatic hypotension in multiple time periods after the monitored object has changed from the first posture state to the second posture state, and determine the physiological parameter data with an amplitude of change less than a preset threshold as the second target physiological parameter data when the amplitude of change of the physiological parameter data in adjacent time periods is less than the preset threshold.

In one embodiment, to monitor physiological parameter data related to orthostatic hypotension after the monitored object has changed from the first posture state to the second posture state, the processor 803 is specifically configured to monitor the physiological parameter data related to orthostatic hypotension once the monitored object has changed from the first posture state to the second posture state, and measure the physiological parameter data related to orthostatic hypotension after the monitored object has been in the second posture state for multiple times according to a preset time interval.

In one embodiment, the processor 803 is further configured to calculate a trend of change and/or difference of change between the first target physiological parameter data and the second target physiological parameter data, while the display 801 is further configured to display the trend of change and/or difference of change on the blood pressure monitoring interface.

In one embodiment, the first posture state is a supine position state, while the second posture state is a standing position state. Physiological parameter data includes a diastolic blood pressure, systolic blood pressure and heart rate.

In one embodiment, to acquire an orthostatic hypotension monitoring result of the monitored object based on the physiological parameter data, the processor 803 is further configured to determine the orthostatic hypotension monitoring result of the monitored object as YES, if the physiological parameter data satisfies a first requirement, a second requirement or a third requirement. Wherein, the first requirement refers to that a decreased value between a systolic blood pressure in the standing position and a systolic blood pressure in the supine position is greater than or equal to a first threshold; the second requirement refers to that the systolic blood pressure in the standing position is less than a second threshold; while the third requirement refers to that a decreased value between a diastolic blood pressure in the standing position and a diastolic blood pressure in the supine position is greater than or equal to a third threshold and a hypotension symptom occurs.

In one embodiment, to acquire an orthostatic hypotension monitoring result of the monitored object based on the physiological parameter data, the processor 803 is further configured to determine the orthostatic hypotension monitoring result of the monitored object as YES, if the physiological parameter data satisfies a fourth requirement, a fifth requirement or a sixth requirement. Wherein, the fourth requirement refers to that a decreased value between a systolic blood pressure in the standing position and a systolic blood pressure in the supine position is greater than or equal to a fourth threshold; the fifth requirement refers to that a decreased value between a diastolic blood pressure in the standing position and a diastolic blood pressure in the supine position is greater than or equal to a fifth threshold; while the sixth requirement refers to that an increased value between a standing heart rate and a supine heart rate is greater than or equal to a sixth threshold.

In one embodiment, the display 801 is further configured to display the physiological parameter data and the orthostatic hypotension monitoring results on the blood pressure monitoring interface.

In one embodiment, the input device 802 is further configured to receive hypotension symptoms when the monitored object changes from the first posture state to the second posture state. The orthostatic hypotension monitoring apparatus also includes a memory for storing the hypotension symptoms.

In a further embodiment of the present disclosure, an orthostatic hypotension monitoring apparatus is provided, which including a processor and a memory mutually coupled, wherein the memory is configured to store machine readable codes comprising instructions which enable the orthostatic hypotension monitoring apparatus to perform following operations when read from the memory and executed by the processor detecting whether a monitored object is in a stable first posture state;

measuring first target physiological parameter data related to orthostatic hypotension of the monitored object in the first posture state, when detecting that the monitored object is in the stable first posture state;

detecting whether the monitored object has changed from the first posture state to a second posture state;

measuring second target physiological parameter data related to orthostatic hypotension of the monitored object in the second posture state, when detecting that the monitored object has changed from the first posture state to the second posture state;

acquiring an orthostatic hypotension monitoring result of the monitored object based on the first target physiological parameter data and the second target physiological parameter data.

In one embodiment, the orthostatic hypotension monitoring apparatus can further include a communication interface, through which the orthostatic hypotension monitoring apparatus can be communicated with an image acquisition device such as a camera for receiving video image data of the monitored object acquired by the image acquisition device. Alternatively, the orthostatic hypotension monitoring apparatus is integrated with an image acquisition module for acquiring video image data of the monitored object. Thus, the specific steps for the processor to detect whether the monitored object is in a stable first posture state can comprise acquiring video image data of the monitored object, and then recognizing whether the monitored object is in a stable first posture state according to the video image data. The specific steps for the processor to detect whether the monitored object has changed from the first posture state to the second posture state can comprise acquiring the video image data of the monitored object and recognizing whether the monitored object is in the second posture state according to the video image data.

Alternatively, in another embodiment, the processor is configured to acquire the video image data of the monitored object, recognize whether the monitored object is in the first posture state according to the video image data, and then time the monitored object when the monitored object is in the first posture state, and further detect whether a time duration that the monitored object is in the first posture state satisfies a preset time duration, thus determining whether the monitored object is in a stable first posture state.

In one embodiment, the orthostatic hypotension monitoring apparatus can further include a communication interface, through which the orthostatic hypotension monitoring apparatus can be communicated with a hospital bed device. When the processor detects whether the monitored object is in a stable first posture state, it can send a detection instruction to the hospital bed device through the communication interface to enable the hospital bed device to detect the posture state of the monitored object and return the posture state detection result. Then the processor determines whether the monitored object is in the stable first posture state according to the posture state detection result. When the processor detects whether the monitored object has changed from the first posture state to the second posture state, it sends a detection instruction to the hospital bed device to enable the hospital bed device to detect the posture state of the monitored object and return the posture state detection result. Then the processor determines whether the monitored object is in the second posture state according to the posture state detection result.

Figure 9:
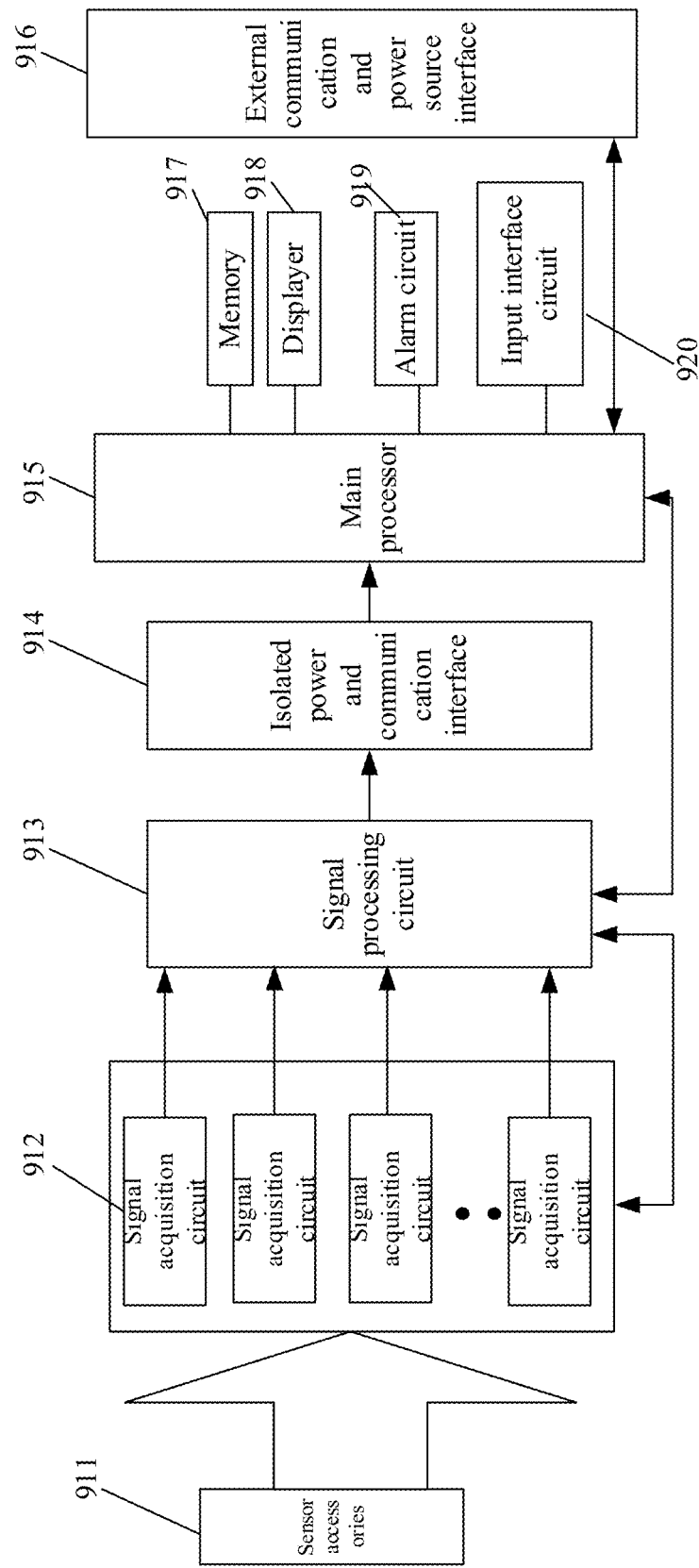
FIG. 9 shows a schematic structural diagram of a monitor in accordance with an embodiment of the disclosure.

The orthostatic hypotension monitoring apparatus can be specifically a monitor, and a specific example of which is shown in FIG. 9. FIG. 9 provides a system framework diagram of a parameter processing module in a multi-parameter monitor.

The multi-parameter monitor has an independent housing, whose panel is provided with a sensor interface zone which is integrated therein multiple sensor interfaces for connecting with various external physiological parameter sensor accessories 911. The housing panel also includes a small IxD display zone, a display 918, an input interface circuit 920 and an alarm circuit 919 (such as, a LED alarm zone). A parameter processing module is used as an external communication and power source interface for communicating with a main unit and taking power from the main unit. The parameter processing module also supports a build-out parameter module, can form a plug-in monitor main unit by means of inserting the parameter module, can be used as part of the monitor, or can be connected to the main unit via a cable, with the build-out parameter module being used as an external accessory of the monitor. In addition, the multi-parameter monitor includes a memory 917 for storing computer programs and various data generated during the related monitoring process.

The internal circuit of the parameter processing module is disposed inside the housing. As shown in FIG. 9, the internal circuit includes a signal acquisition circuit 912 corresponding to at least two physiological parameters, a front-end signal processing circuit 913 and a main processor 915.

The main processor 915 can implement each step related to each orthostatic hypotension monitoring method described above.

The signal acquisition circuit 912 may be selected from an electrocardiogram circuit, a respiration circuit, a body temperature circuit, a blood oxygen saturation circuit, a non-invasive blood pressure circuit, an invasive blood pressure circuit, etc. These signal acquisition circuits 912 are electrically connected with corresponding sensor interfaces for electrically connecting to sensor accessories 911 corresponding to different physiological parameters. An output terminal of the signal acquisition circuit 912 is coupled to the front-end signal processing circuit 913 whose communication terminal is further coupled to the main processor 915. The main processor 915 is electrically connected with the external communication and power interface 916.

Various general circuits and modules known in the prior art can be used to realize the signal acquisition circuit 912 for various physiological parameters. The front-end signal processing circuit 913 can be configured to complete the sampling and analog-to-digital conversion of output signals of the signal acquisition circuit 912, and output control signals to control the physiological parameter measurement process. The physiological parameters include but are not limited to parameters of electrocardiogram, respiration, body temperature, blood oxygen saturation, non-invasive blood pressure, and invasive blood pressure.

The front-end signal processing circuit 913 can be realized by a single-chip microcomputer or other semiconductor devices, or ASIC or FPGA. The front-end signal processing circuit 913 can be powered by an isolated power supply. After a simple processing and packaging, the sampled data can be sent to the main processor through an isolated communication interface. For example, the front-end signal processing circuit 913 can be coupled to the main processor 915 through the isolated power and communication interface 914.

Supplying electrical power to the front-end signal processing circuit through the isolated power supply has a function of isolating the patient from the power supply equipment through isolating the DC/DC power supply via a transformer. In such a way, the application part is floating through the isolation transformer, such that the leakage current passing through the patient is small enough, and bad influences on boards and devices of intermediate circuits, such as main control board (guaranteed by creepage distance and electrical clearance), due to voltage or energy generated during a defibrillation or electric knife application, can be prevented.

The main processor completes the calculation of physiological parameters and sends calculation results and waveforms of the physiological parameter to the main unit (such as, a main unit with a display, PC, a central station, etc.) through the external communication and power interface. The external communication and power source interface 916 may be one or a combination of local area network interfaces composed of Ethernet, Token Ring, Token Bus, and optical fiber distributed data interface (FDDI) as the backbone of these three networks, may also be one or a combination of wireless interfaces such as infrared, Bluetooth, WIFI, and WMTS communication, or may also be one or a combination of wired data connection interfaces such as RS232 and USB.

The external communication and power source interface 916 may also be one or a combination of the wireless data transmission interface and the wired data transmission interface. The main unit may be any computer device such as a main unit of the monitor, an electrocardiograph, an ultrasonic diagnosis instrument, a computer, etc. A monitor can be formed by means of installing with matching software. The main unit may also be a communication device, such as a mobile phone, and the parameter processing module sends data to a mobile phone that supports Bluetooth communication via a Bluetooth interface to realize remote data transmission.

The description has been made with reference to various exemplary embodiments herein. However, those skilled in the art will recognize that changes and modifications can be made to the exemplary embodiments without departing from the scope herein. For example, various operation steps and components for performing operation steps may be implemented in different ways according to a specific application or considering any number of cost functions associated with the operation of the system (for example, one or more steps may be deleted, modified, or incorporated into other steps).

The terms "first", "second", etc. in the specification and the claims herein as well as the above accompanying drawings are used to distinguish different objects, rather than to describe a specific order. In addition, the terms "comprising", "having", and any variations thereof are intended to cover non-exclusive inclusion. For example, a process, a method, a system, a product, or a device that includes a series of steps or units is not limited to the listed steps or units, but optionally further includes unlisted steps or units, or optionally further includes other steps or units inherent in these processes, methods, or devices.

In addition, as understood by those skilled in the art, the principles herein may be reflected in a computer program product on a computer-readable storage medium that is pre-installed with computer-readable program codes. Any tangible, non-transitory computer-readable storage medium can be used, including magnetic storage devices (hard disks, floppy disks, etc.), optical storage devices (CD-ROM, DVD, Blu Ray disks, etc.), flash memory, and/or the like. These computer program instructions can be loaded onto a general-purpose computer, a dedicated computer, or other programmable data processing device to form a machine, so that these instructions executed on a computer or other programmable data processing apparatus can generate an apparatus that implements a specified function. These computer program instructions can also be stored in a computer-readable memory that can instruct a computer or other programmable data processing device to operate in a specific manner, so that the instructions stored in the computer-readable memory can form a manufactured product, including an implementation apparatus that implements a specified function. The computer program instructions can also be loaded onto a computer or other programmable data processing device, so that a series of operating steps are performed on the computer or other programmable device to produce a computer-implemented process, so that the instructions executed on a computer or other programmable data processing device can provide steps for implementing specified functions.

The foregoing specific description has been described with reference to various embodiments. However, those skilled in the art will recognize that various modifications and changes can be made without departing from the scope of the present disclosure. Therefore, consideration of the present disclosure will be in an illustrative rather than a restrictive sense, and all such modifications will be included within the scope thereof. Also, the advantages of various embodiments, other advantages, and the solutions to problems have been described above. However, the benefits, advantages, solutions to problems, and any elements that can produce these, or solutions that make them more explicit, should not be interpreted as critical, necessary, or essential. The term "comprising", and any other variants thereof used herein are non-exclusive, so that the process, method, document, or device that includes a list of elements includes not only these elements, but also other elements that are not explicitly listed or do not belong to the process, method, system, document, or device. Furthermore, the term "coupling" and any other variations thereof used herein refer to physical connection, electrical connection, magnetic connection, optical connection, communication connection, functional connection, and/or any other connection.

The above-mentioned examples merely represent several embodiments, giving specifics and details thereof, but should not be understood as limiting the scope of patent of this disclosure thereby. It should be noted that a person of ordinary skill in the art could also make several variations and improvements without departing from the concept of this disclosure, and these variations and improvements would all fall within the scope of protection of this disclosure. Therefore, the scope of protection of patent of this disclosure should be in accordance with the appended claims.

What is claimed is:

1. An orthostatic hypotension monitoring apparatus, comprising:
   a display;
   an input device;
   a processor; and
   memory coupled to the processor, the memory storing one or more programs configured to be executed by the processor the one or more programs including instructions for:
   displaying, via the display, a blood pressure monitoring interface that includes operation instruction information about a posture state of a monitored object;
   receiving, via the input device, a first input indicating that the monitored subject is in a first posture state;
   in accordance with receiving the first input indicating that the monitored subject is in the first posture state, starting timing and outputting, via the display, a timer indicating a first time duration;
   after the first time duration, acquiring, via the processor, first physiological parameter data measurements related to orthostatic hypotension of the monitored object in the first posture state;
   after acquiring the first physiological parameter data measurements, receiving, via the input device, a second input indicating that the posture state of the monitored subject has changed from the first posture state to a second posture state;

in accordance with receiving the second input indicating that the posture state of the monitored subject has changed from the first posture state to a second posture state:
acquiring, via the processor, second physiological parameter data measurements related to orthostatic hypotension of the monitored object in the second posture state; and
outputting, via the display, an orthostatic hypotension monitoring result of the monitored object based on the first physiological parameter data and the second physiological parameter data.

2. The orthostatic hypotension monitoring apparatus according to claim 1, wherein the operation instruction information comprises at least one of the following:
a first instruction information that instructs to confirm whether the monitored object is in a stable first posture state; and
a second instruction information that instructs to confirm whether the monitored object has changed from the first posture state to the second posture state.

3. The orthostatic hypotension monitoring apparatus according to claim 2, wherein the first instruction information comprises an instruction information that instructs to confirm whether the monitored object is in the first posture state, and an instruction information that instructs to confirm a time duration that the monitored object is in the first posture state.

4. The orthostatic hypotension monitoring apparatus according to claim 2, the one or more programs including instructions for:
measuring first target physiological parameter data related to orthostatic hypotension of the monitored object in the first posture state, in response to a state confirmation instruction inputted based on the first instruction information.

5. The orthostatic hypotension monitoring apparatus according to claim 4, the one or more programs including instructions for:
measuring second target physiological parameter data related to orthostatic hypotension of the monitored object in the second posture state, in response to a state confirmation instruction inputted based on the second instruction information.

6. The orthostatic hypotension monitoring apparatus according to claim 5, wherein the instructions for measuring the second target physiological parameter data related to orthostatic hypotension of the monitored object in the second posture state include instructions for:
monitoring physiological parameter data related to orthostatic hypotension of the monitored object in multiple time periods after the monitored object has changed from the first posture state to the second posture state, and
determining the physiological parameter data having an amplitude of change less than a preset threshold as the second target physiological parameter data when the amplitude of change of the physiological parameter data in adjacent time periods is less than the preset threshold.

7. The orthostatic hypotension monitoring apparatus according to claim 6, wherein the instructions for monitoring the physiological parameter data related to orthostatic hypotension after the monitored object has changed from the first posture state to the second posture state include instructions for:
monitoring the physiological parameter data related to orthostatic hypotension of the monitored object once the monitored object has changed from the first posture state to the second posture state, and
measuring the physiological parameter data related to orthostatic hypotension of the monitored object for multiple times according to a preset time interval after the monitored object has been in the second posture state.

8. The orthostatic hypotension monitoring apparatus according to claim 5, the one or more programs further including instructions for:
calculating a trend of change or a difference of change between the first target physiological parameter data and the second target physiological parameter data, while the display is further configured to display the trend of change or difference of change on the blood pressure monitoring interface.

9. The orthostatic hypotension monitoring apparatus according to claim 2, wherein the first posture state refers to a supine position, the second posture state refers to a standing position, the physiological parameter data comprises a systolic blood pressure, a diastolic blood pressure and a heart rate, and
wherein in order to acquire an orthostatic hypotension monitoring result of the monitored object based on the physiological parameter data, the one or more programs further including instructions for:
determining the orthostatic hypotension monitoring result of the monitored object as YES, if the physiological parameter data satisfies a first requirement, a second requirement or a third requirement, wherein the first requirement refers to that a decreased value between the systolic blood pressure in the standing position and the systolic blood pressure in the supine position is greater than or equal to a first threshold; the second requirement refers to that the systolic blood pressure in the standing position is less than a second threshold; while the third requirement refers to that a decreased value between the diastolic blood pressure in the standing position and the diastolic blood pressure in the supine position is greater than or equal to a third threshold and a hypotension symptom occurs; or
determining the orthostatic hypotension monitoring result of the monitored object as YES, if the physiological parameter data satisfies a fourth requirement, a fifth requirement or a sixth requirement, wherein, the fourth requirement refers to that a decreased value between the systolic blood pressure in the standing position and the systolic blood pressure in the supine position is greater than or equal to a fourth threshold; the fifth requirement refers to that a decreased value between the diastolic blood pressure in the standing position and the diastolic blood pressure in the supine position is greater than or equal to a fifth threshold; while the sixth requirement refers to that an increased value between a standing heart rate and a supine heart rate is greater than or equal to a sixth threshold.

10. An orthostatic hypotension monitoring apparatus, comprising:
a processor; and
a memory mutually coupled to the processor, wherein the memory is configured to store machine readable codes comprising instructions which that, when executed by the processor, cause the orthostatic hypotension monitoring apparatus to perform operations comprising:

determining that a monitored object is in a stable first posture state, including:
  receiving a first input indicating that the monitored subject is in a first posture state; and
  in accordance with receiving the first input indicating that the monitored subject is in the first posture state, starting timing and outputting, via the display, a timer indicating a first time duration;
after the first time duration, determining that the monitored object is in a stable first posture state and measuring first target physiological parameter data related to orthostatic hypotension of the monitored object in the first posture state;
detecting whether the monitored object has changed from the first posture state to a second posture state;
in accordance with detecting that the monitored object has changed from the first posture state to the second posture state, measuring second target physiological parameter data related to orthostatic hypotension of the monitored object in the second posture state; and
acquiring an orthostatic hypotension monitoring result of the monitored object based on the first target physiological parameter data and the second target physiological parameter data.

11. The orthostatic hypotension monitoring apparatus according to claim 10, detecting whether the monitored object is in a stable first posture state further includes:
  acquiring video image data of the monitored object; and
  recognizing whether the monitored object is in the stable first posture state according to the video image data.

12. The orthostatic hypotension monitoring apparatus according to claim 10, wherein detecting whether the monitored object is in the stable first posture state further includes:
  acquiring video image data of the monitored object;
  recognizing whether the monitored object is in the first posture state according to the video image data; and
  acquiring a time duration that the monitored object is in the first posture state while the monitored object is in the first posture state, and detecting whether the time duration satisfies a preset time duration.

13. The orthostatic hypotension monitoring apparatus according to claim 10, wherein detecting whether the monitored object is in the stable first posture state further includes:
  sending a detection instruction to a hospital bed device to enable it to detect a posture state of the monitored object and then return a posture state detection result; and
  determining whether the monitored object is in a stable first posture state according to the posture state detection result.

14. The orthostatic hypotension monitoring apparatus according to claim 10, wherein detecting whether the monitored object has changed from the first posture state to the second posture state further includes:
  acquiring video image data of the monitored object; and
  recognizing whether the monitored object is in a second posture state according to the video image data.

15. The orthostatic hypotension monitoring apparatus according to claim 10, wherein detecting whether the monitored object has changed from the first posture state to the second posture state further includes:
  sending a detection instruction to a hospital bed device to enable the hospital bed device to detect a posture state of the monitored object and then return a posture state detection result; and
  determining whether the monitored object is in a second posture state according to the posture state detection result.

16. An orthostatic hypotension monitoring method, comprising:
  displaying a blood pressure monitoring interface, including displaying via the blood pressure monitoring interface an operation instruction information about a posture state of a monitored object;
  receiving, via the blood pressure monitoring interface, a first input indicating that the monitored subject is in a first posture state;
  in accordance with receiving the first input indicating that the monitored subject is in the first posture state, starting timing and outputting, via the display, a timer indicating a first time duration;
  after the first time duration, acquiring first physiological parameter data measurements related to orthostatic hypotension of the monitored object in the first posture state;
  after acquiring the first physiological parameter data measurements, receiving, via the input device, a second input indicating that the posture state of the monitored subject has changed from the first posture state to a second posture state;
  in accordance with receiving the second input indicating that the posture state of the monitored subject has changed from the first posture state to a second posture state:
    acquiring, via the processor, second physiological parameter data measurements related to orthostatic hypotension of the monitored object in the second posture state; and
    outputting, via the blood pressure monitoring interface, an orthostatic hypotension monitoring result of the monitored object based on the first physiological parameter data and the second physiological parameter data.

17. The orthostatic hypotension monitoring method according to claim 16, wherein the operation instruction information comprises:
  a first instruction information that instructs to confirm whether the monitored object is in a stable first posture state; or
  a second instruction information that instructs to confirm whether the monitored object has changed from the first posture state to the second posture state.

18. The orthostatic hypotension monitoring method according to claim 17, further comprising:
  measuring first target physiological parameter data related to orthostatic hypotension of the monitored object in the first posture state, in response to the state confirmation instruction inputted based on the first instruction information.

19. The orthostatic hypotension monitoring method according to claim 17, further comprising:
  measuring second target physiological parameter data related to orthostatic hypotension of the monitored object in the second posture state, in response to the state confirmation instruction inputted based on the second instruction information.

* * * * *